US007089114B1

(12) United States Patent
Huang

(10) Patent No.: US 7,089,114 B1
(45) Date of Patent: Aug. 8, 2006

(54) VEHICLE COLLISION AVOIDANCE SYSTEM AND METHOD

(76) Inventor: Baojia Huang, 1352 Kingfisher Way, Sunnyvale, CA (US) 94087

( * ) Notice: Subject to any disclaimer, the term of this patent is extended or adjusted under 35 U.S.C. 154(b) by 0 days.

(21) Appl. No.: 10/613,885

(22) Filed: Jul. 3, 2003

(51) Int. Cl.
    *G01C 3/08* (2006.01)
(52) U.S. Cl. ............... 701/301; 701/70; 701/96; 701/97; 340/435; 340/436; 340/903; 340/904
(58) Field of Classification Search ............ 701/70, 701/96, 97, 301; 340/435, 436, 903, 904
    See application file for complete search history.

(56) References Cited

U.S. PATENT DOCUMENTS

| 4,737,958 | A | * | 4/1988 | Sizer, II ................. 372/18 |
| 5,046,184 | A | * | 9/1991 | Chee et al. ................. 372/18 |
| 5,296,924 | A | * | 3/1994 | de Saint Blancard et al. ............... 348/118 |
| 5,314,037 | A | * | 5/1994 | Shaw et al. ................. 180/169 |
| 5,455,669 | A | * | 10/1995 | Wetteborn ................. 356/5.01 |
| 5,529,138 | A | * | 6/1996 | Shaw et al. ................. 180/169 |
| 5,585,798 | A | * | 12/1996 | Yoshioka et al. ............. 342/70 |
| 5,714,928 | A | * | 2/1998 | Sudo et al. ................. 340/436 |
| 5,864,391 | A | * | 1/1999 | Hosokawa et al. ......... 356/4.01 |
| 6,370,475 | B1 | * | 4/2002 | Breed et al. ................. 701/301 |
| 6,580,385 | B1 | * | 6/2003 | Winner et al. ................. 342/70 |
| 2001/0003810 | A1 | * | 6/2001 | Shinmura et al. ........... 701/301 |
| 2002/0091479 | A1 | * | 7/2002 | Maruko et al. ............... 701/96 |
| 2002/0198632 | A1 | * | 12/2002 | Breed et al. .................. 701/1 |

FOREIGN PATENT DOCUMENTS

DE     19713826 A1 * 10/1997

* cited by examiner

Primary Examiner—Thomas G. Black
Assistant Examiner—Eric M. Gibson

(57) ABSTRACT

A vehicle collision avoidance system includes a 360 degree circumferentially rotating pulsed infrared laser beam scanner apparatus which rotates in a horizontal plane and a vertical plane simultaneously for generating a first signal representative of an obstacle. An analog processing circuit is coupled to the circumferentially rotating pulsed infrared laser beam scanner apparatus for processing the first signal and generating a plurality of signals. A processor is coupled to the processing circuit for processing the plurality of signals and generating a braking signal and providing a braking apparatus with the braking signal. Associated methods are also provided. The system and method of the invention are based on a second order model which characterizes the relationship in both space and time between the vehicle and the obstacle. The circumferentially rotating pulsed infrared laser beam scanner apparatus includes an eye-safe laser apparatus in terms of peak power, pulse width, repetition rate and divergent angle.

17 Claims, 9 Drawing Sheets

(1) When $Vf = (Vd/dt)/dt < 20 m/s^{**}3$, timer starts and t1 is recorded. — 510

(2) Record $Vr$ and $a$ at this time: — 520
$Vr = dR/dt = 18$ $dVe/dt = Vd$ (3) When $Vf = 0$ again, timer stops and t2 recorded. — 530

(4) Find Ts — 540
$\boxed{Ts = t2 - t1}$ (5) Determine Q — 550
$Q = Ts - \alpha / \omega$ Scanner — 555

(6) Find Tc (Time to Collision occuring) — 560
$Tc = R / Vr$ (7) Quoteria factors for Collision Judgement (a) Set $L = 1$ if $Q = 0$ and $L = 0$ if $Q = 0$
$M = 1$ if $Tc < 0$; and $M = 0$ if $Tc > 0$
Set $N = 1$ if ABS of $R/Vr < 2$, and $N = 0$ if ABS of $R/Vr > 1.5$ (b) $K = L * M * N$ (8) $K = 1$, Collision will occur and immediate braking required; — 570
$K = 0$; No collision will occur shortly, no braking control action required.

Notes 1: When laser scanning beam (the front of the wave bandle) sweeps from AB to BC, which represents the relative speed at this case.

Note 2: Mechanical control is based on judgement on above logic sequence.

Note 3: With scanner continuously sweeping, all parts of any obstacle will detected and treated.

Note 4: This is the fundamental model algorithm, for detail and practical, please refer to table 6: Signal Process and Operation Time

FIG 5

US 7,089,114 B1

VEHICLE COLLISION AVOIDANCE SYSTEM AND METHOD

BACKGROUND OF THE INVENTION

The present invention generally relates to vehicle collision avoidance systems and methods and more particularly to a vehicle collision avoidance system and method employing a rotating pulsed infrared laser beam scanner apparatus for detecting obstacles circumferentially of the vehicle.

Vehicle collision avoidance systems and methods are well known in the art. For example, U.S. Pat. No. 4,825,211, "Warning Device for Vehicles Against an Approaching Objects" discloses a warning device for use on a vehicle for sensing an approaching object when the vehicle is moving backwards. The device produces a first signal when the object is in remote proximity of the vehicle and at least a second signal when the object is in close proximity of the vehicle.

U.S. Pat. No. 4,872,051, "Collision Avoidance Alarm System" discloses a passive collision avoidance system. An optical sensor is disposed to provide a continuous raster scan of the scene within a wide angle of the direction of travel of the vehicle. This sensor output is converted into digital data and stored. A computer system compares consecutive scenes to detect identifiable objects. For such identifiable objects, the computer calculates the centroid of the object and its angle, and a measure of the size or extent of the object. Detection of an object having a constant angle and an increasing measure of extent causes an alarm to be triggered.

U.S. Pat. No. 5,314,037 "Automobile Collision Avoidance System" discloses a system based on laser radars for aiding in avoidance of automobile collisions. The system includes laser radars with transmitters and receivers, a computer, a warning device and an optional automatic braking device. The system compares a predicted collision time with a minimal allowable time to determine the immanency of a collision. When the system determines that a situation likely to result in an accident exists, it provides a warning. The optional automatic braking device is used when the vehicle user fails to respond to the warning.

U.S. Pat. No. 5,410,304 "Method and Apparatus for Displaying the Impending Danger Due to Speed Associated with the Driving Situation of a Vehicle" discloses a method in accordance with which a degree of danger is defined and calculated and displayed to the driver of a vehicle, the degrees of danger indicating whether the driver of the vehicle is driving too close to a vehicle in front or other obstacle or is driving too fast in a fog. The signals necessary for this purpose are obtained from vehicle environment sensors, for example from a distance warning radar or distance recording radar and an infrared visual range measuring system, and are analyzed, together with vehicle condition signals, by a safety computer. On the basis of its specific programming, the computer determines, for the respective current driving condition, which of two degrees of danger is instantaneously predominant and indicates the condition which is respectively more critical to safety on a display.

U.S. Pat. No. 5,463,384 "Collision Avoidance System for Vehicles" discloses a system including an object detection module mounted on a vehicle for detecting the presence of an object within a monitored zone of space adjacent the vehicle. The detection unit emits a plurality of beams of infrared energy and detects the reflection of such energy from objects within the zone. The detection module is typically activated by the host vehicle's electrical turn signal. The detection module includes a plurality of associated pairs of light emitting diodes and photosensitive detectors for sensing the reflected light.

U.S. Pat. No. 5,646,612 "Method for Avoiding Collision of Vehicle and Apparatus for Performing the Same" discloses an apparatus which determines a kind of an object ahead of a vehicle to warn a driver based on the kind of the object and properly performs deceleration and braking operations based on a position of the object and a speed of the vehicle.

U.S. Pat. No. 6,012,008 "Method and Apparatus for Predicting a Crash and Reacting Thereto" discloses an apparatus which is mounted on a vehicle and determines the time-to-impact for approaching obstacles that are within a limited distance from the host vehicle. The system can be deployed in the front of the host vehicle for warning of frontal impact, and at the sides for warning of side impact.

U.S. Pat. No. 6,470,273 "Collision Warning System" discloses a system including pairs of optical sensors integral to a moving vehicle. Each of the optical sensors of the pairs of said sensors is enabled for the detection of visible light magnitudes and infrared light magnitudes in the external vicinity of the vehicle, and for creating corresponding electrical signals. The optical sensors are directed in a physically spaced apart manner along a line of travel of the vehicle. Temporal changes in the magnitudes of the electrical signals and a probability of a collision with an object external to the vehicle are determined and a warning signal is generated when collision is possible.

As can be seen, the prior art discloses systems and methods for sensing objects and potential collisions within narrow ranges, generally in the direction of vehicle travel or to cover "blind spots", and as such there is a need for a vehicle collision avoidance system and method employing a rotating pulsed infrared laser beam scanner apparatus for detecting obstacles circumferentially of the vehicle.

SUMMARY OF THE INVENTION

In accordance with one aspect of the invention, a vehicle collision avoidance system includes a rotating pulsed infrared laser beam scanner apparatus for generating a first signal representative of an obstacle; a processing circuit coupled to the rotating pulsed infrared laser beam scanner apparatus for processing the first signal and generating a plurality of signals; a processor coupled to the processing circuit for processing the plurality of signals and generating a braking signal; and a braking apparatus responsive to the braking signal.

In accordance with another aspect of the invention, a method of avoiding a vehicle collision includes determining features of an obstacle using a rotating pulsed infrared laser beam scanner apparatus; processing signals representative of the determined features; and braking the vehicle in the event the processed signals indicate an imminent collision.

These and other features, aspects and advantages of the present invention will become better understood with reference to the following drawings, description and claims.

BRIEF DESCRIPTION OF THE DRAWINGS

FIG. 5 is a listing showing an algorithm in accordance with the present invention;

DETAILED DESCRIPTION OF THE INVENTION

The following detailed description is of the best modes of carrying out the invention. The description is not to be taken in a limiting sense, but is made merely for the purpose of illustrating the general principles of the invention, since the scope of the invention is best defined by the appended claims.

The present invention generally provides a vehicle collision avoidance system and method employing a rotating pulsed infrared laser beam scanner apparatus for detecting obstacles circumferentially of the vehicle.

Figure 1:
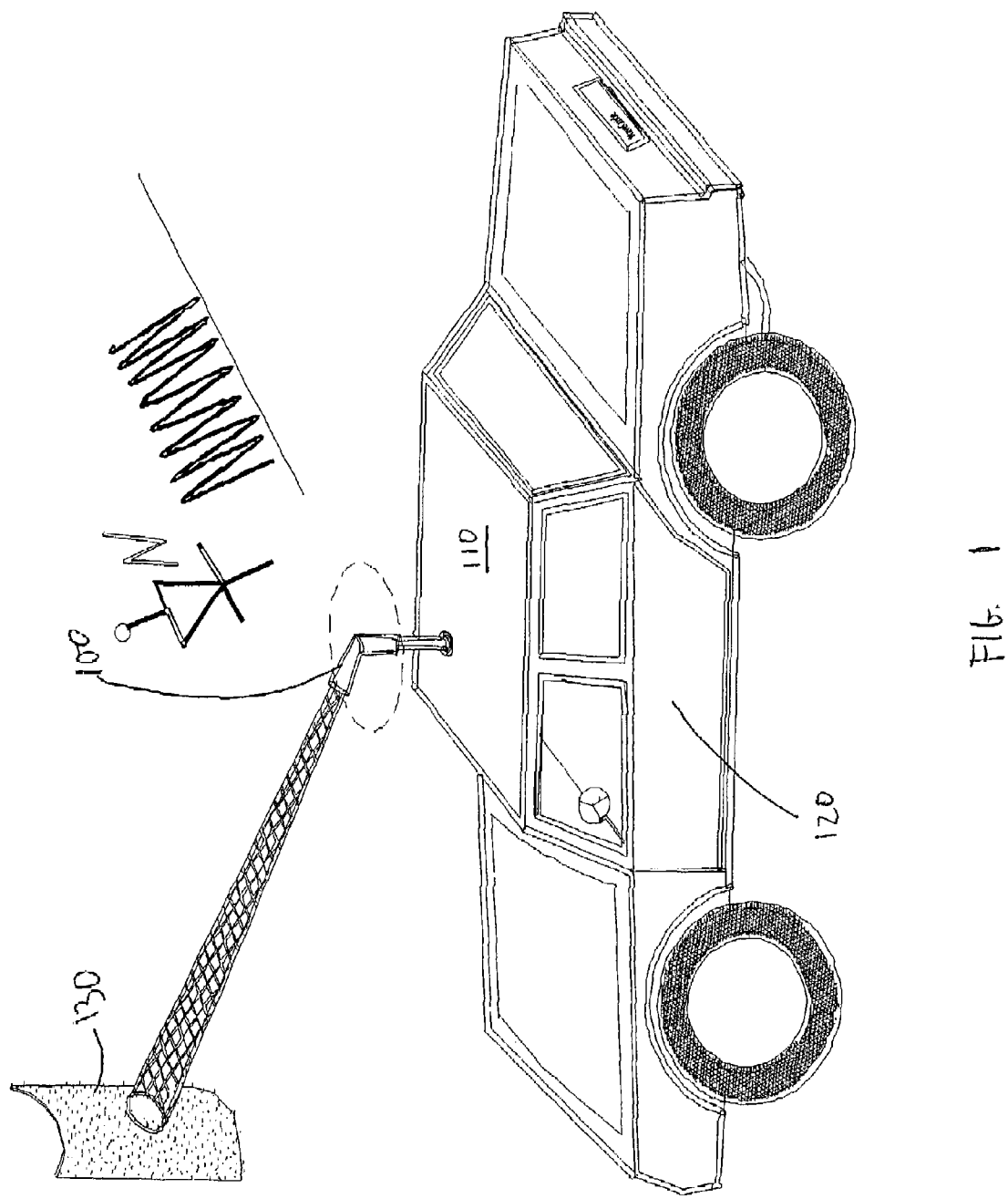
FIG. 1 is an isometric view of a vehicle having mounted thereon a rotating pulsed infrared laser beam scanner apparatus in accordance with the present invention.
Figure 2:
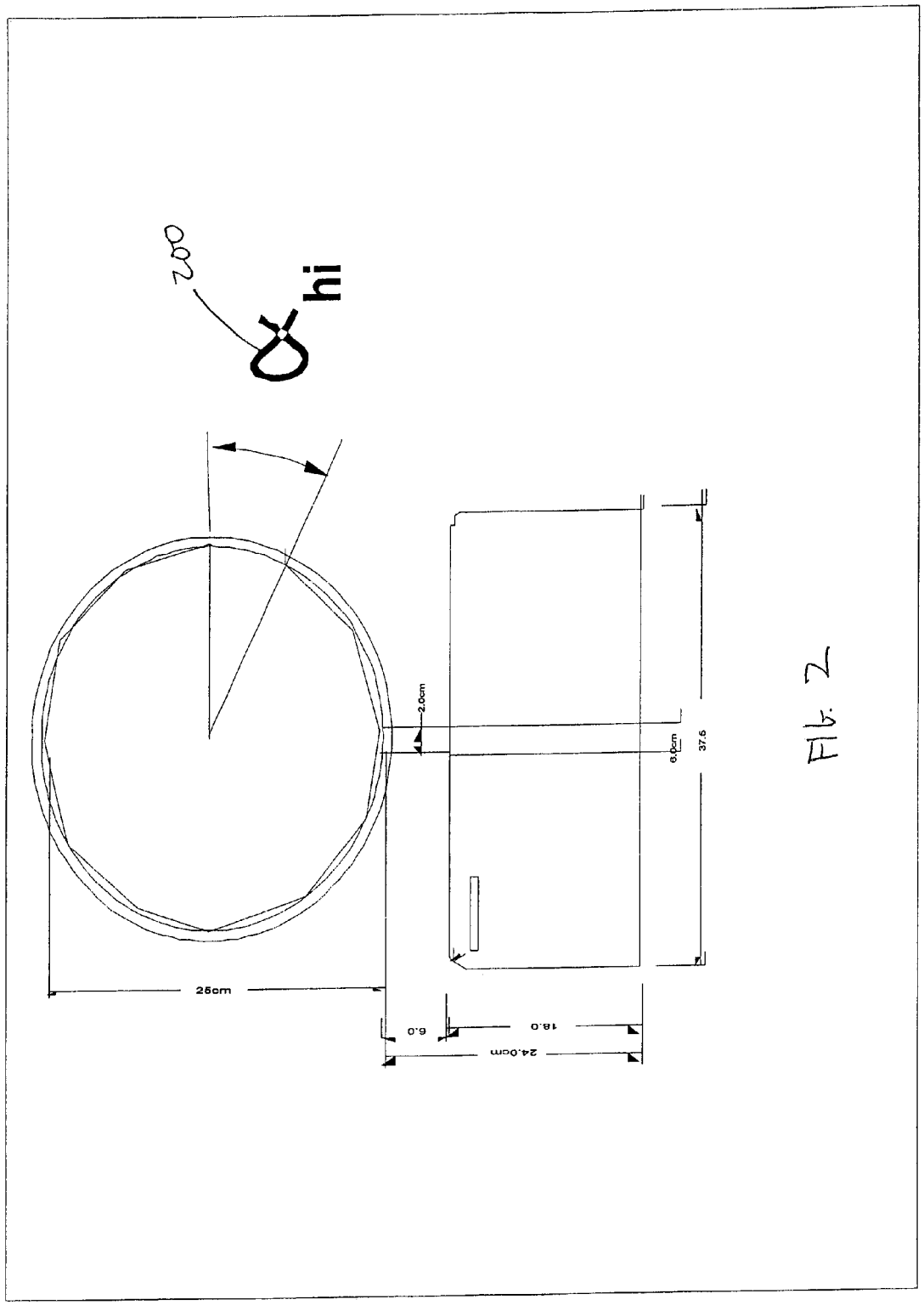
FIG. 2 is a schematic view showing a sector in accordance with the present invention.

With reference to FIG. 1, a system in accordance with the invention includes a rotating pulsed infrared laser beam scanner apparatus 100 mounted on a top 110 of a vehicle 120 for transmitting and receiving an infrared laser beam having properties as further described in Table 1. Advantageously, the rotating scanner apparatus 100 includes both horizontal and vertical scanning capabilities. More specifically, the rotating scanner apparatus 100 rotates in a horizontal plane at 48 revolutions per second and in a vertical plane at 8 sectors per second. A sector 200 is shown in FIG. 2 and may include an angle α of 2.5 degrees with the sectors ranging from 28.8 degrees to 88.8 degrees.

Figure 2A:
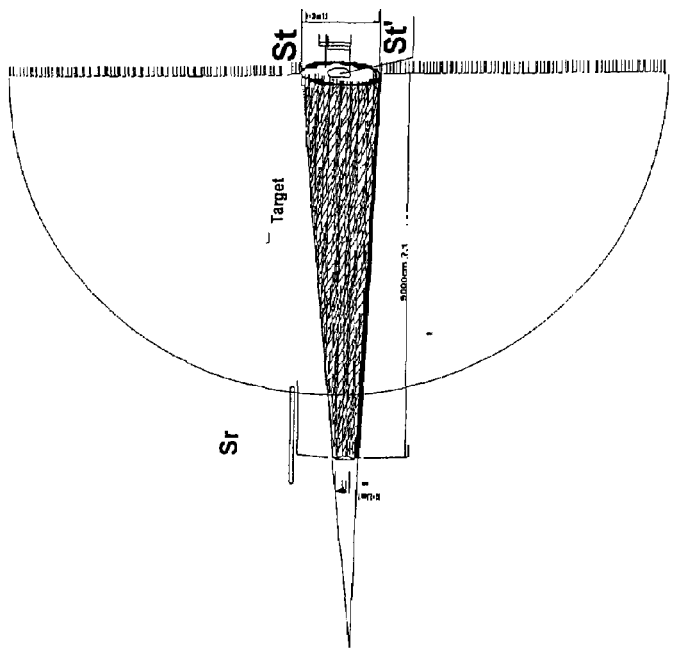
FIG. 2A is a schematic view of an infrared laser beam in accordance with the present invention.

Referring to FIG. 2A, the scanning power $P_t$ of the rotating pulsed infrared laser beam scanner apparatus 100 may be computed using a reflected area (half sphere) Sr of 2 Pi R**2 and a lens diameter of Dl=50 mm. Then the efficiency $\eta_T$ $$=\eta rf * [(st'/st)*(sl/sr)] \quad (1)$$

$$=0.25*[(\pi Rt'^2/\pi Rt^2)*(\pi Rl^2/2\pi R^2)] \quad (2)$$

$$=[(Dt^2/Dt^2)*(Dl^2/(Dr)^2]*0.25*1/2 \quad (3)$$

$$=0.125[(Dl/Dr)]**2 \quad (4)$$

$$=0.125((5/18)(18/18,000))**2 \quad (5)$$

$$=9.65 \text{ Exp}(-9) \quad (6)$$

$$Pt \cdot \eta_T = P_{RE} \quad (7)$$

$$Pt \geq 10^{-9} W \quad (8)$$

$$Pt_{(peak)} \geq 10^{-9}/9.65 \text{ Exp}(-9) \quad (9)$$

$$=0.104 \text{ W} \quad (10)$$

$$=104 \text{ mw} \quad (11)$$

where ηrf: is the reflection rate—the ratio of reflected power (or energy) over insertion power (or energy), Rt is the area on the target intercept with the laser beam, Rt' is the minimum detectable as design required on the object, and R is the distance to an object 130 (FIG. 1) from the rotating pulsed infrared laser beam scanner apparatus 100. Considering modulation factor 1/100 (carrier purpose) & 0.5 (for ranging purpose, it becomes $$Pt(\text{Average}) = 104/200 \quad (12)$$

$$= 0.520 \text{ mW}. \quad (13)$$

TABLE 1

Specification of Pulsed Infrared Laser

| | Optics Properties | | | Physical Properties | | | |
|---|---|---|---|---|---|---|---|
| Transmitter | Wavelength Range | 1,000 nm to 1,550 nm, excludes 1,300 to 1,400 nm. | Divergent **Angle | α = 0.00212206 rad = 0.763942° 10–20 cm | | | |
| | Peak Power | Pt (peak, max) = 28.45 W Pt (Ave.) = 104 mW | Diameter of the lens in Target | D1 = 50 mm D2 = 18 cm, | | | |
| | Typical Repetition Rate | Repetition Rate frr: 10 Mhz to 110 Mhz Pulse width T (constant): 1.0 ns (25% tolerance) | Horizontal Longitudinal | Hosting disk Sector (in the disk hosted to the hosting disk) | Period 20.83 ms 125 ms | Rotation Speed RPS = 48 SPS = 8 (Here SPS stands for "Sectors Per Second") | |
| | Sensitivity Power Density at the cornea | Exp (−9) W 0.530 mw/sqcm | Scanner body at Vertical Section | Not greater than 2.5 cm | | | |
| | Channels | 1,000 | Scanner body diameter at Horizontal Section | Not greater than 2.5 cm | | | |
| Modulating (For ranging purpose) | Frequency | 833.33 khz | | | | | |

To have 40 db (100 times of power factor) reserved power capacity to cope with foggy/rainy or dirty targets, it may be necessary to raise the transmitted power potential into a maximum value $$Pt(\text{Max}) = 0.104 * 100 \quad (14)$$

$$= 10.4 \text{ W} \quad (15)$$

$$Pt(\text{max, Average}) = 0.52 * 100 \quad (16)$$

$$= 52 \text{ mw} \quad (17).$$

Power of average level, at the cornea after counting the duration when the cornea truly receives the laser beam may be calculated as $$P(RE, \text{average, cornea}) = \text{Prac} \quad (18)$$

$$= 52 \text{ mw} * R*\theta/2Pi*R \quad (19)$$

$$= 52 * 0.002/2Pi \quad (20)$$

$$= 52/3125 \quad (21)$$

$$= 0.0166(\text{mw}) \quad (22)$$

where $P_{RE}$ is the receiving power on the sensor and $P_t$ is the transmitting power from transmitter.

From the above computations several conclusions can be obtained. A first conclusion is that the ideal peak transmit power Pt (peak, Res) of the pulsed laser able to deal with reserved potential for a worst condition, may at least be 12.2 W or P (peak, Res)$\geq$10.4 w. A second conclusion is that the basic power requirement (without reserved capacity) may be Pt (peak, basic)=104 mw. A third conclusion is that the average maximum received power (counting in the object occupation at the circumference factor) may be Pre (AVE) =0.0166 mw. Finally, a fourth conclusion is that the power density on the cornea may be Pre (density)=Pt (AVE)*S (cornea)/S(target))/S(cornea)

$$= \text{Prac}/S(\text{target}) \quad (23) =$$

$$= 0.0166 \text{ mw}/Pi*Rt**2 \quad (24)$$

$$= 0.0166 \text{ mw}/3.14*(Rt(\min)*0.0002)**2 \quad (25)$$

$$= 0.0166 \text{ mw}/3.14 (50*0.002)**2 \quad (26)$$

$$= 0.0166 \text{ mw}/0.0314 \text{ Sqcm} \quad (27)$$

$$0.530 \text{ mw}/\text{Sqcm} \quad (28)$$

where St is an area on the target—a cross section formed at certain distance away from the laser source where the propagating laser beam is cut by the target body, Rt is the distance from the laser source to the surface denoted as St, Rt (min) is the minimum distance of Rt determined by the real situation, here taken to be 50 cm for safety purposes.

To determine if the pulsed laser beam of the invention is safe in its application in terms OF IEC regulations, the following three computations can be performed. (1) MPE (single) requirement: Compute the MPE for a single pulse at wave length of 1030–1050 nm, 1 ns to 100 ns (Exp(–9)s to Exp(–7)s pulse width range with pulse duration shorter than 1 ms yielding EMP (Single)=5 Exp(–3) C4C6J/sqm=0.005× 5×1.33/10,000=3.3 Exp (–6) J/sq cm. (2) Since the pulsed laser series is designed to be uniform, thus it meets the item B requirement—limited in table 6 and 8 on the IEC60825-1. (3) Find total MPE(train) within the duration for which the concerned target(s) are exposed under the pulsed laser beam. (Average exposure in the train can not possess more energy that if it exists as a single pulse as). Since T=0.002/ 200*2Pi=1.6 Exp(–6) then F=Exp 7, N=F (carrier, mod)*T (total)=1.1 Exp 8*1.6 Exp (–6)=176. Hence MPE (train) =MPEs N**(–0.25)=3.3 Exp(–6)*176**(–0.25)=3.3 Exp(– 6)* 0.275=0.906 Exp (–6)J/sqcm. This is the maximum power limit for any pulse in the pulse train. Now compute the max transmitting peak power allowed: MPE(s)/A=Pt*Tp where Tp is the pulse width of the laser pulse series and Tp=Exp(–9)s, Pt (peak, max)=A*MPE(s)/Tp=0.0314 sqcm*0.906 Exp(–6)/Exp(–9)=28.448 W (safety required). Therefore Pt(peak, max)=28.448W. According to items (1), (2) and (3) above, the infrared pulsed laser of the invention, featuring 9W peak power, 1.03–1.06 um wavelength and 0.002 rad transmitting angle, dual modulating and dual plane rotating, fully satisfies and complies with IEC 60825 product safety requirements. As the power specified above is for a 700 to 1050 nm laser beam, for higher ranges, the peak power permitted is larger. In considering both factors regarding system sensitivity and water media absorption, the wavelength range may be selected in the region from 1,000 nm to 1,550 nm. The allocation of the wavelength may be based on a few factors, including the availability of the component resource. Generally, the region from about 1,300 nm to 1,400 nm may be excluded to avoid energy loss of the laser beam due to moisture absorption in its propagating path. The power requirements are summarized in Table 2.

TABLE 2

Power Requirements

| Power Type | System needs | | Adapted | |
| --- | --- | --- | --- | --- |
| | Minimum (basic) Requirement | With Reserved Capacity (40 dB Reserved) | Design As high as what system requires | IEC 60825 Limit Maximum |
| Peak Value | .104 W | 10.4 W | 15 W | >28.45 W |
| Average Value | .52 mW | 52 mW | 75 mW | >142 mW |
| Wave Main Properties | Best Selected Wavelength: 1450 to 1550 nm (IEC 60825 table under Corresponding Frequency Range) Retetition Rate: 10 Mhz to 110 Mhz (Exp 7 Hz to 1.1 Exp 8 Hz) Pulse Width: 1.0–1.25 ns (constant) | | | |

Figure 3:
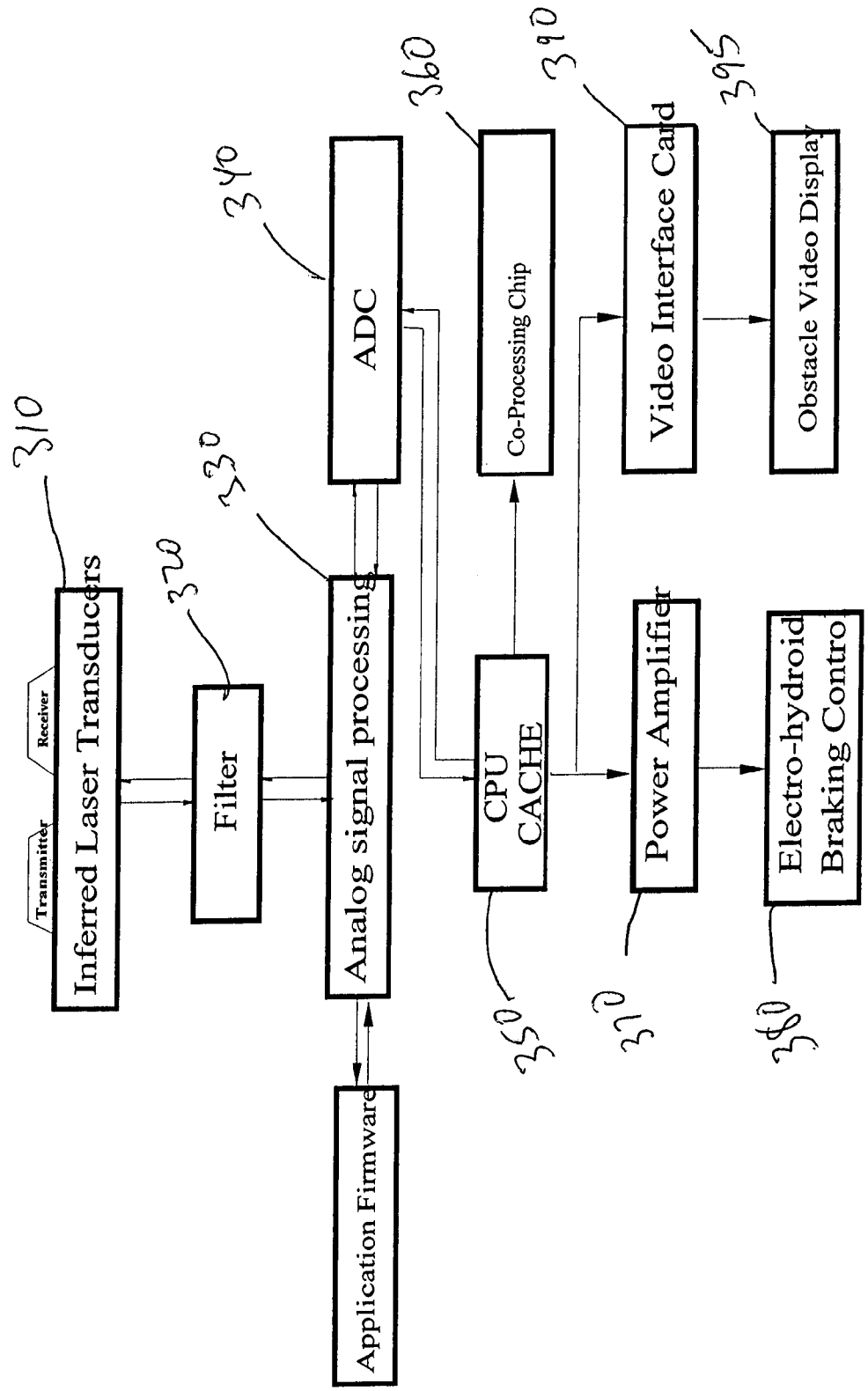
FIG. 3 is a block diagram of a method of avoiding vehicle collisions in accordance with the present invention.

With reference to FIG. 3, a method generally designated 300 of avoiding a vehicle collision is shown including a step 310 of transmitting and receiving an infrared laser beam using the rotating pulsed infrared laser beam scanner apparatus 100 described herein. A reflected laser beam is filtered in a step 320 and processed in a step 330. Analog signal processing is achieved using application firmware. In a step 340 the processed analog signal is converted to a digital signal and processed by a digital processor in a step 350 and a co-processor in a step 360. An output signal from the digital processor is amplified by a power amplifier in a step 370 and input to an electro-hydroid braking control in a step 380. An output signal from the digital processor is also input to a video interface in a step 390 and an output of the video interface is input to a display in a step 395. By operation of the method 300, a vehicle collision is avoided by applying a braking force to the vehicle in step 380 under conditions as further described herein.

Figure 4:
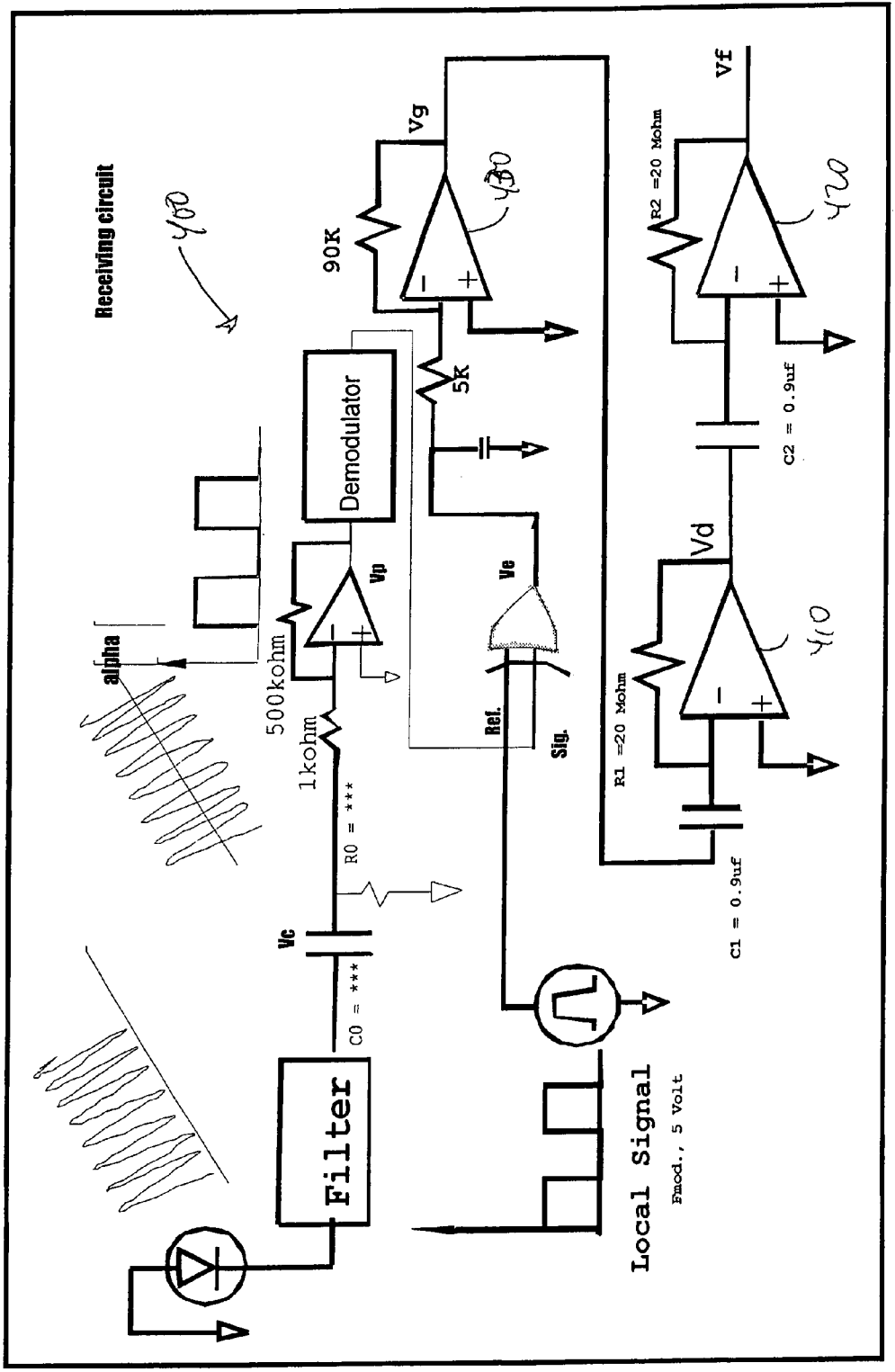
FIG. 4 is a circuit diagram of a an analog circuit in accordance with the present invention.

FIG. 4 shows an analog circuit generally designated 400 for determining R, R'(t) and R"(t) corresponding to step 330. Using the circuit 400, R is taken at the output of op amp 430 (Vg), R'(t) is taken at the output of op amp 410 (Vd), and R"(t) is taken at the output of op amp 420 (Vf).

To avoid interference, a channel scrambler is provided. Each vehicle is allowed to transmit and receive its own channel separated by a channel band-width of 100 kHz to avoid interference from signals produced by other vehicles using the system and method of the invention. A conventional channel dividing method may be employed to achieve this result as outlined in Table 3. One thousand channels may be used by following the following analysis. In US the total number of vehicles is assumed to be 50 million and among these, 10 million use the system and method of the invention. Hence the maximum number of vehicles in an area subject to mutual interference is 1000. So the system concentration over the total vehicle population in the US is 1/5 and the channel concentration over the system is 1/1000. As the result, the channel concentration over the entire population of vehicles is 1/5*1/1000 or 1/5000. Then for a region having 1000 vehicles, the number of these vehicles sharing the same channel is 500*1/5000 or 0.1 vehicles. As two vehicles are required to cause a mutual disturbance, 2/0.1 or 20 is the safety factor.

TABLE 3

Channel Scrambler Design

| Channel number | N = 1,000 | | |
|---|---|---|---|
| Bank Width | B = 100 Khz = 0.1 Mhz | Filter Type | Frequency Division |
| Repetition Range*** | F (L) = 10 Mhz, F (H) = 110 Mhz | Resonant Q Value | *** |

FIG. 5 shows an algorithm generally designated 500 implementable in the digital processor to achieve the purposes of the invention. In a step 510 Vf is computed as shown and t1 is recorded. In a step 520 Vr is recorded. Then in a step 530 when Vf is equal to zero a timer is stopped and t2 recorded. In a step 540 Ts is determined as (t2−t1). In a step 550 Q is determined as shown. Then in a step 555 Tc, the time to collision is determined as Tc=R/Vr. In a step 560 criteria are set as shown. Finally in a step 570 a determination is made if a collision will occur or not.

In order to determine the signal processing time, assume the scanner system has 200 revolution/s in the horizontal direction, and the laser beam sweeps over maximum (full condition) 3000 obstacle bodies during each revolution, that is $$NOB(\text{max}) = 200 \; Pi/.002$$

$$= 3,000.$$

Since detecting one obstacle body consumes 116 ns, then the time needed to process data for one revolution is $$T(1Rev.) = PTP(S) * NOB(\text{max}) \quad (29)$$

$$= 127 \; ns * 3000 \quad (30)$$

$$= .381 \; Exp \; 6(ns) \quad (31)$$

$$= 381 \; (uS) \quad (32)$$

$$= 0.381 \; (ms) \quad (33)$$

The time necessary for processing data obtained within one second's scanning $$T(1s) = 0.381 \; ms * 200 \quad (34)$$

$$= 76.2 \; ms \quad (35)$$

$$= 0.076 \; S \quad (36)$$

which means there is sufficient time to process all the data, or the data processing speed is fast enough to meet the system requirements. The operating times are summarized in Table 4.

The system overall properties are summarized in Table 5.

TABLE 4

Single Process Algorithm & Operating Time (One "Obstacle Body")

| | | | Analog Sampling | Data Process | A/D | Computing Or Logic Fetch | Short | Mul. | REG | Subtotal (ns) |
|---|---|---|---|---|---|---|---|---|---|---|
| Distance Related | Ri | 1.5/Sin αhi | 1 | 5 | 2 | 1 | 0 | 4 | 1 | 14 |
| | Vi | dRc/dt | 0 | 1 | 2 | 1 | 0 | 0 | 1 | 5 |
| | I | VI < 0 I = 1 VI > 0 I = 0 | 0 | 0 | 0 | 1 | 1 | 0 | 1 | 3 |
| | a | dv/dt | 0 | 1 | 2 | 0 | 0 | 0 | 1 | 4 |
| | a' | da/dt | 0 | 1 | 2 | 0 | 0 | 0 | 1 | 4 |
| | ρ | \|a'\| ~20 m/s³ | 0 | 0 | 0 | 2 | 1 | 0 | 1 | 4 |
| | M | ρ > 0 M = 1 ρ < 0 M = 0 | 0 | 0 | 0 | 1 | 1 | 0 | 1 | 3 |

TABLE 4-continued

Single Process Algorithm & Operating Time (One "Obstacle Body")

| Object | Formula | Analog Sampling | Analog Process | A/D | Data Fetch | Computing Or Logic Short | Computing Or Logic Mul. | REG | Subtotal (ns) |
|---|---|---|---|---|---|---|---|---|---|
| Angle Related | $\omega b'$ | 2 | 1 | 2 | 2 | 1 | 0 | 1 | 9 |
| | | Ts − 1.592 Exp (−6) | | | | | | | |
| | $\beta$ | d $\omega b'$/dt | 0 | 1 | 1 | 0 | 0 | 1 | 1 | 4 |
| | N | $\beta < 0$ N = 1 | 0 | 0 | 0 | 1 | 1 | 0 | 1 | 3 |
| | | $\beta > 0$ N = 0 | | | | | | | | |
| | | | | | | | | | | 16 |
| Time Related | Ts | t2 − t1 | 2 | 1 | 2 | 2 | 1 | 0 | 1 | 9 |
| | $T_\omega$ | $\omega b'/\beta$ | 0 | 0 | 0 | 2 | 0 | 4 | 1 | 7 |
| | $T_\omega$ v 1.5 | $\sigma = {}^T\omega - 1.5$ | 0 | 0 | 0 | 1 | 1 | 0 | 1 | 3 |
| | o | $\sigma < 0$ O = 1 | 0 | 0 | 0 | 1 | 1 | 0 | 1 | 3 |
| | | $\sigma > 0$ O = 0 | | | | | | | | |
| | Tri | ((Y**2 − 2Ri * a)**t/2 − Y))/a | 0 | 0 | 0 | 5 | 2 | 5 * 4 = 20 | 1 | 28 |
| | $\gamma$ | $\gamma$-Tri − 1.5 | 0 | 0 | 0 | 1 | 1 | 0 | 1 | 3 |
| | L | $\gamma^{< 0}$ L = 1 | 0 | 0 | 0 | 1 | 1 | 0 | 1 | 3 |
| | | $\gamma^{> 0}$ L = 0 | | | | | | | | |
| | | | | | | | | | | 56 |
| Decision Process Time (Single Obstacle Body) | C | C = MNOLI | 0 | 0 | 0 | 5 | 1 | 0 | 1 | 7 |
| | FTF (S) | | | | | | | | | 116 |

TABLE 5

System Overall Properties

| System Properties | QTT Value | System Properties | QTT Value | Remarks |
|---|---|---|---|---|
| Electrical Signal Process time. | | | | |
| Analog | <0.1 ms | Ranging Distance R | R = 90 m | S < 1,017 cm Sq. (Equivalent to: A circle with R = 18 cm OR A standing pole with two inches width and 2 meters height) |
| Digital | <1 ms | | 90 m < R < 120 m | S = 1,017 sqcm |
| Total | <1.1 ms | | General R > 120 m | S = S0 (R/R0)**0.5 |
| Mechanical Response Required | Tm < 16 ms | Shortest Detecting distance | 1.62 m | Remark: S stands for the area where the scanning laser beam strikes on while R0 = 90 m S0 = 300 sqcm |
| | | Detecting Plane Angle | 360° | |
| Optical Signal Propagating Time | Td < 0.0006 ms | Impact Sustaining In Vertical Axis | 10 g* | |
| Obstacle Tracking Period | Horizontal: 21 ms Longitudinal: 126 ms | Humidity | 40%* | |
| Total Control Time | Between 38 to 143 ms | Detecting Height | 0.2–1.6 m | |

Figure 6:
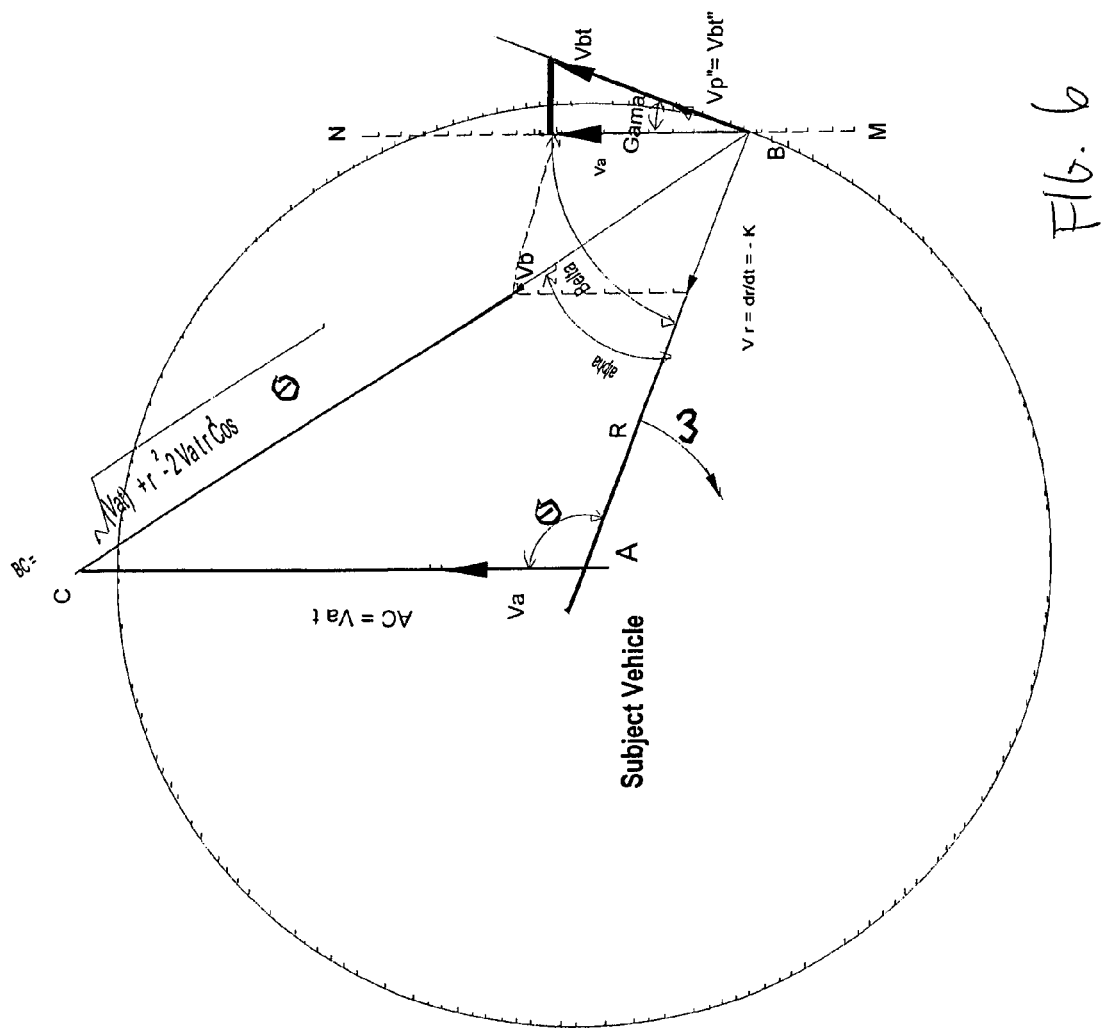
FIG. 6 is a schematic diagram of a coordinate system in accordance with the present invention.

What follows is a discussion of collision criteria. As shown in FIG. 6, two vehicles (Vehicle A and vehicle B) are apart a distance r and travel in the direction with the speeds shown. For the convenience of analysis, we assume that both vehicles a replaced in an absolute angular co-ordinate system—the earth ground, and also the relative system with respect to Vehicle A as the original point of the relative system. Both systems use AC as the positive velocity direction and the clockwise direction as the positive angle and angular velocity direction. Vectors denoted with (') represent the relative system, whereas no (') denotes vectors in the absolute system.

Obviously, the projecting image component of relative angular velocity of Vehicle B along vehicle A's direction axis must be zero, otherwise it will not result in collision with Vehicle A, that is $$Vbt' \cos \gamma = 0 \qquad (37)$$

(in the relative system)

While in the absolute system, it means $$Vbt \cos \gamma = V \qquad (38)$$

According to movement studies, $$Vbt = Va + Vbt' \quad (39)$$

From equation (37), we have either $$\gamma = 90° \quad (40)$$

or $$Vbt' = 0. \quad (41)$$

The condition where $\gamma=90$ is hard to detect, but to detect Vp" and determine that if then Vbt'=0 is possible. From Equation (39), Vbt'=Vbt−Va. Based on Equation (41) and (39), Vbt'=Vpt−Va=0 and thus Vbt=Va.

If conditions $$Vbt = Va \quad (42)$$

and $$dR/dt = -K < 0, \quad (43)$$

are both true, said two vehicles will result in a collision, that is, it will take the same time—t seconds, for Vehicle A to move through segment AC, for vehicle B to move through BC, and for relative distance between Vehicle A and Vehicle B to become zero. In the mean time, all AC, BC and AB=r will be on the same tri-angle, upon applying equations (42) and (43).

The mathematical statements below prove that if these two vehicles start from A and B points, after same time t, they move over distance AC and BC upon which AC, BC and r will be able to construct an exact triangle, in other words, they meet at the same time and the same location and a collision occurs. By inspecting triangle ABC, we have $$AC = Va * t \quad (44)$$

$$AB = d \quad (45)$$

The triangle hence should meet:

$$BC = (Vat^2 + R^2 - 2Vat*R*\cos\theta)^{1/2} \quad (46)$$

$$\text{but } t = R/|dr/dt| = R/k \quad (47)$$

$$\text{and } Vb^2 = K^2 + Va^2 - 2Kva \cos\theta \quad (48)$$

(where Vb stands for the absolute velocity of Vehicle B)

That is $$Vb = (K^2 + Va^2 - 2KVa \cos\theta)^{1/2} \quad (49)$$

The time for vehicle B to travel to C will be $$T1 = BC/Vb = \quad (50)$$

$$(Vat)^2 + R^2 - 2 Vat*R*\cos\theta)^{1/2}$$

$$(K^2 + Va^2 - 2KVa \cos\theta)^{1/2}$$

The time for the distance between Vehicle A and B to become zero should be, according to Vr=dr/dt $$T2 = R/|Vr| = R/K \quad (51)$$

Since when the time collision to occurs, $$T1 = T2 = t, \text{ hence } R/K =$$

$$(Vat^2 + R^2 - 2Va*t*R*\cos\theta)^{1/2}$$

$$(K^2 + Va^2 - 2 KVa \cos\theta)^{1/2}$$

$$r^2/K^2 =$$

$$Va^2*r^2/K^2 + r^2 - 2 Va*r/K*r*\cos\theta$$

$$K^2 + Va^2 - 2 K Va \cos\theta$$

Crossing multiplying both sides of this equation and then simplifying it to find that Left side=Right side $$= r^2 K^2 + r^2 va^2 - 2 Kr^2 Va \cos\theta$$

This means the equation is true.

That Vbt'=0 implies that

R*wb'=Vbt'=0. Since R can not be zero requires that $\omega$ has to be zero, thus we withdraw the criteria to determine if a collision between two vehicles' defined above should occur at:

$$\omega b' = 0 \quad (52)$$

The relative angular velocity is zero or $$\alpha = Ts * \omega c \text{ and}$$

$$dR/dt = Vr < 0 \quad (53)$$

And the condition when the braking action to be needed is:

$$|T r| \leq 1.5(s) \quad (54)$$

Figure 7:
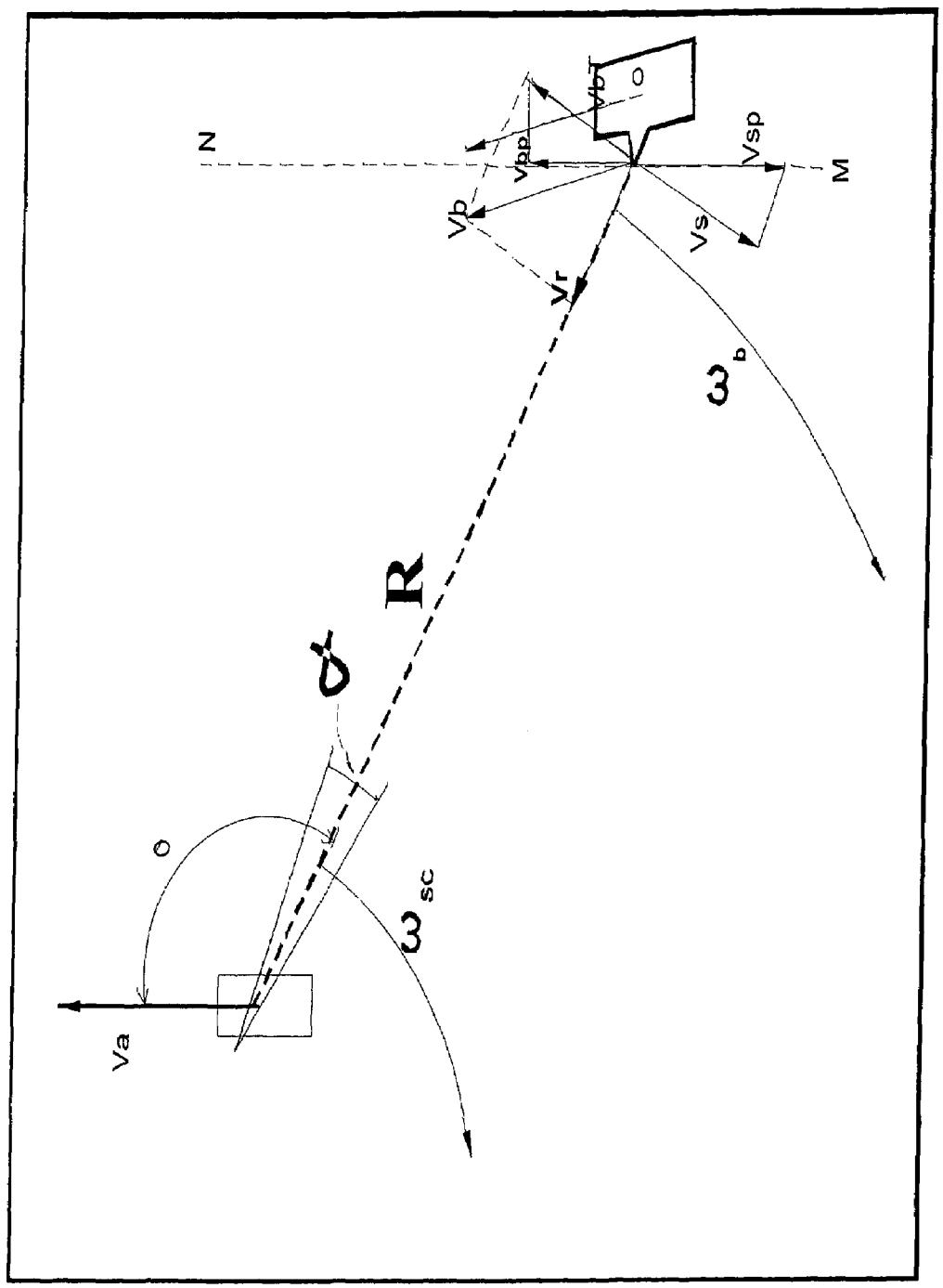
FIG. 7 is a schematic diagram of a coordinate system in accordance with the present invention.
Figure 8:
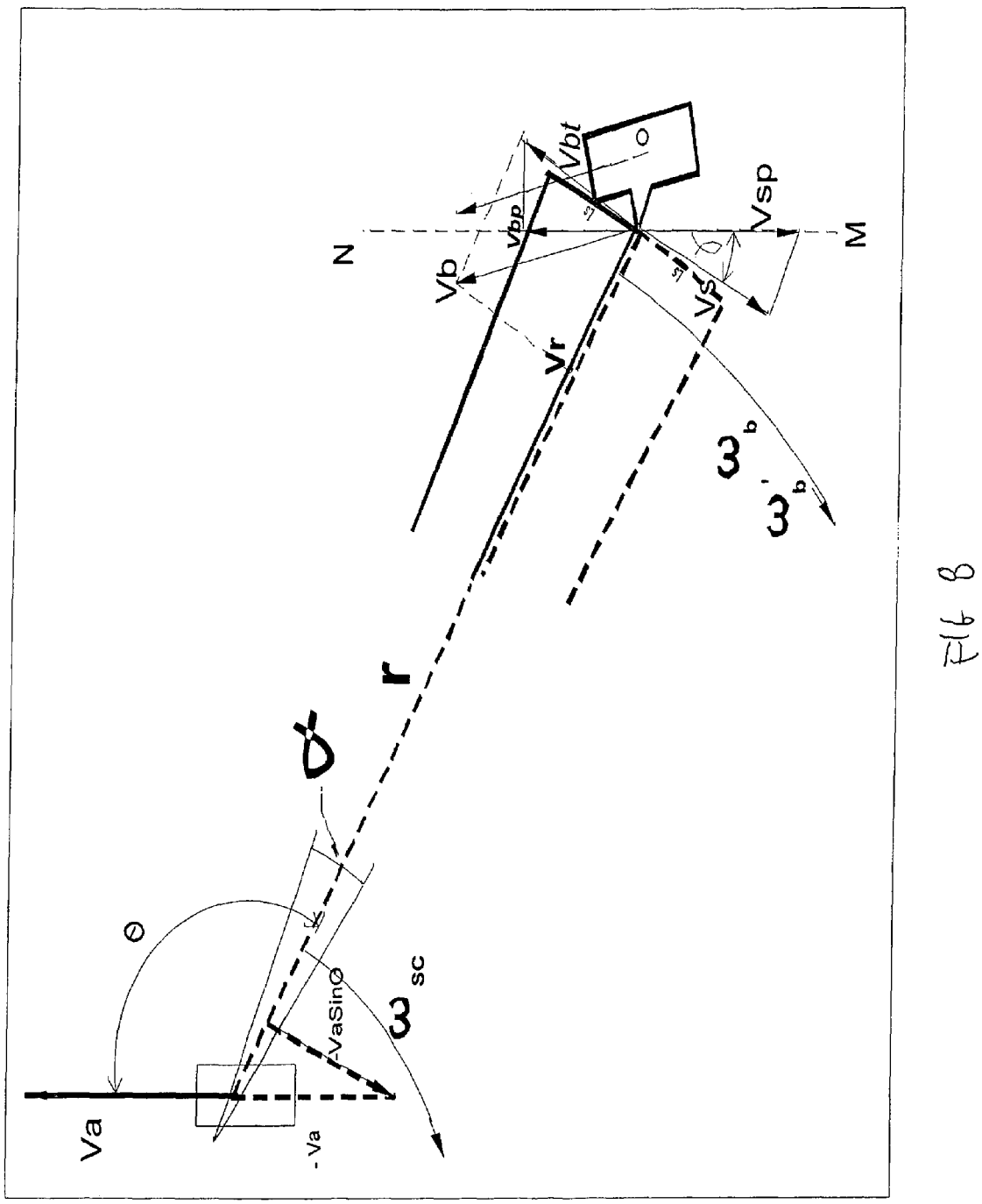
FIG. 8 is a schematic diagram of a coordinate system in accordance with the present invention.

With reference to FIGS. 7 and 8 $\omega b'$ is defined as the relative angular velocity, from Vehicle A to the dot pointed by the laser beam vector striking on Vehicle B, turning around Vehicle A clock wisely, $\omega b$ is defined as angular velocity, from Vehicle A to the dot pointed by the laser beam vector striking on Vehicle B, turning around Vehicle A clock wisely, $\omega sc$ is defined as the angular velocity of the Infrared Laser Scanner, Vb is defined as the velocity of the scanned obstacle, Vs is defined as the line velocity of the scanning beam at the scanned point on the obstacle, A is defined as the diverging angle of the scanning inferred laser beam, Ls is defined as the length the beam vector sweeps over, and Ts is defined as the period for the entire laser beam pass over the extreme point, during which the changing rate of the relative distance maintains zero, mathematically expressed as "dR/dt=0".

Let Vbp and Vsp stand for Vb's and Vs's projection along Va's direction line MN respectively. Then $$Ls = R * \alpha$$

$$(VbT + \omega sc * R - Va \cos\gamma) = R * \alpha \quad (55)$$

Since $$\cos\gamma = \cos(90 - (180 - \theta))$$

$$= \cos(-90 + \theta) = \cos(90 - \theta)$$

$$= \sin\theta$$

Hence equation (55) becomes $$(Vbt + \omega scR - Va \sin\theta)Ts = R * \alpha \quad (56)$$

and $$Vbt = R * \alpha / Ts - \omega scR + Va \sin\theta.$$

And because $$Vbt' = Vbt - Va \sin\theta It \text{ yields}$$

$$Vbt' = R * \alpha / Ts - \omega sc * R \quad (57)$$

$$\omega b'^{*}R = Vb'R = Vbt'R$$

$$\omega b' = Vbt'/R = (R*\alpha/Ts - \omega scR)/R$$

$$\omega b' = \alpha/Ts - \omega sc \quad (58)$$

When $\omega b' = 0$ $$\alpha/Ts - Ts - \omega sc = 0$$

That is $\alpha/Ts = \omega sc$ $$\alpha = Ts*\omega sc \quad (59)$$

In order to determine the collision criteria $\omega h$ must be computed. The value $\omega h$ stands for the relative horizontal component of the angular velocity defined in equation (58), and it relates to the longitudinal component and the resultant component $\omega$ T by $$\omega T^2 = (\omega h^2 + \omega L^2)$$

which can be expressed as $$\omega h = (\omega T^2 - \omega L^2)^{**1/2} \quad (60)$$

Since the period Tl must ideally be greater than Th to avoid a permanent dead corner in the obstacle detecting process, as well as reducing the error caused by inducing $\omega L$ in the calculations, we let $$TL = 10 \ Th.$$

Because the longitudinal angle is $\pi/6$, we have $$\pi/6\omega L = 10*2\pi/\omega h.$$

From this we obtain $$\omega h = 120\omega L \quad (61)$$

From equation. (60) and equation (61) we know that means $\omega L$ is much smaller than $\omega h$ and $$\omega L/\omega h = 0.008333$$

$$\omega h/\omega T = 1/(1+0.008332^2)^{**0.5}$$

$$= 1/1.0000347 \sim 1$$

That is, $\omega sc \sim \omega h$ $$= \alpha/Ts - \omega sc$$

$$\omega b' = \alpha/Ts - \omega h \quad (62)$$

In the real world, the algorithm for data processing to determine collision criteria may be more complicated—not all objects on the road will result in a collision, when the height of the object is low enough, it should be defined a "bumpy" instead of collision. In terms of the real road condition, since $$1.6 - R \ \text{Sin} \ \alpha h \leq 1/3 Rw$$

$$= 0.30/3$$

$$= 0.10 \ M$$

where R is the distance to the obstacle and Rw is the radius of the vehicle's wheels, normally be 0.3 m. The longitudinal angle denoted as '$\alpha$' is obtained by a specially design semiconductor angle detecting device, in which the measured longitudinal angle is in proportional to the illuminating passing through lights. Thai is, when $$R \geq 1.5/\text{Sin} \ \alpha h \quad (63)$$

will be judged as a collision case and be added as one of the collision criteria.

To predict the collision more accurately, the system of the invention may be non-linear, that is, the distance is the function of the longitudinal angle, and the relative velocity and relative angular velocity to the obstacle can be a second order variable, as described below.

$$\omega = \omega 0 + \beta t$$

$$R = R0 + V0t + 1/2at^{**}2$$

where $\beta$ is defined as $$\beta = d(\omega b')/dt, \ \text{where}$$

$$\omega b' = \alpha/Ts - \omega h.$$

as shown in equation (59) and $^T\omega$ is defined that after that duration the relative angle between two objects will become zero.

During the driving period, disregarding any traffic site (high way, freeway, streets, local paths, parking log, ... etc.), based on the any measured data (with sampling rate 20 Mhz), once the measured data R, Ts, as we as other computed data such as a, $\omega$, $\beta$, Tr and $^T\omega$, meet the equations listed below, a collision with a obstacle is concluded to occur within short time (1.5 s) and the proper control must be taken to avoid a collision accident.

Since the data is continuously coming in and updated, the application of braking or the real situation modifies the criteria, the conclusion of the prediction about the collision may vary, hence the control action may persist, change (the strength of the braking, for instance) or cancel depending on the instantaneous computation result, but once braking starts, the control signal will be held for at least 250 ms, waiting for the next reliable updated control signal. Note that all these operations are completed automatically without the driver's extra effort. Because the system keeps updating its control status every 250 ms, the driver's participation will change the detecting result and the system will automatically count all these promptly in its analysis and control decision making.

$$Tr = ((V0^{**}2 - 2R0*V't)^{**}1/2 - V0))/a \leq 1.5 \ s$$

$$T\omega = \omega b'/\beta \leq 1.5 \ s$$

Any collision relates to a body, regardless of its material make-up, which can be metal, wood, cement, rock, plastics a human body . . . etc. In order to deal with the individual bodies, certain data are sampled in some critical points to determine the collision prediction.

An obstacle body in the traffic environment can be a single body, such a 20 cm diameter standing wire pole to support cables, a vehicle of a few meters in length, a body of a human being of 20 to 45 cm width typically, or a building as wide as 4 to 100 meters. (If the data from any mass point on the body suggests a collision to occur, then we define that it is a collision.) To simplify the computation, we also assume reasonably that all points in the same body will have the same velocity, angular velocity, acceleration and their higher order derivatives. Thus, we can use these data to represent the entire body, for example, if information from these mass points does not suggest an immediate collision, then there is no collision control will be evoked.

Separating the individual bodies by $$dR/dt > \text{Exp} \ 6$$

where t=t1@dR/dt>0 associates the starting edge of the body while t=t2@dR/dt<0 associates the stopping edge of the obstacle body, since the length of the laser beam changes dramatically at these two points, while the within the same body usually not. If there is more than one time of $$V=dR/dt>+\text{Exp } 6$$

found consecutively, only the first one counts, while if there is more than one time of $$dR/dt<-\text{Exp } 6$$

found, the last one counts. All points found in this interval are regarded as one obstacle body.

Remark: The obstacle body width D looks to the subject vehicle to be $$D \sim R^*\omega sc^*(t2-t1)$$

$$Ts=t2-t1$$

Start sampling by the period of 400 ns (2.5 Mhz) typically during the period between t1 and t2 mentioned above, so that 1.6 us will sweep over an entire scanning angle. For each sampled data of "R" that associates with the body denoted as Ri, the system hardware and software will obtain, calculate and keep truck of the associated parameters, such as $$V=dRc/dt,$$

$$a=dV/dt, \text{ and}$$

$$da/dt=a'(t)$$

$$\alpha hi=f(\text{Area being illuminated})$$

An obstacle body will receive many times within one turn sweeping of the laser scanning, depending on the distance and its size. For example, at 90 meters away, a 18 cm wide pole will receive about 16 points sampling if the repetition of the scanning laser wave is 10 Mhz. Note that αhi is the look-down angle respecting to the horizontal direction and is obtained from a special device built in to the system that measures the angle through measuring the output power from a photo-sensitive semiconductor.

Determine the ai, dai/dt for all points in the obstacle body. Determine the ai, vi dai/dt in the critical point. When $$da/dt \sim 0$$

it is the critical point because at this point the a, v reflect the true value of the obstacle body. As mentioned above, the data a, v, dv/dt obtained from the same body are also applicable to other points the entire body. Hence we can judge if one, some or all of these points should resulted in an immediate collision or not.

If any one of these points within the body (does not necessarily have to be more than one) are predicted to resulted in a collision, then this obstacle body is predicted to result in a immediate collision.

The five criteria below may be used in the circuit and algorithm to determine the possibility of collision for all points sampled from the "Obstacle Body":

$$\omega b'=Ts-1.6 \text{ Exp}(-1.6)$$

$$Ri \geq 1.5/\text{Sin } \alpha hi \tag{64}$$

$$V=dRc/dt \leq 0 \tag{65}$$

$$\beta=d\omega b'/dt \leq 0 \tag{66}$$

$$Tri=((V^{**}2-2(Ri-Rd)^*a)^{**}1/2-V))/V't \leq 1.5 \tag{67}$$

$$T\omega=\omega b'/\beta \leq 1.5 \tag{68}$$

Ri: m a: m/s

β: radian/sqs Tri: s $T\omega$: s Rd: m where Rd is one half of the vehicle's diagonal, which varies with different types of vehicles (referring to the top view of the vehicle). A typical value for Rd is 2.25 m. The reason to subtract Rd from Ri is that Ri, as a data obtained and computed from the system, originally refers to the distance between the center of the scanner to the target where the laser beam strikes in that particular sampling. Since the collision will occur between the nearest portion of two vehicles at the beginning of collision, not between the scanner and the obstacle target spot where the laser beam reaches, this conversion is necessary. One half of the diagonal is just an approximated model to simplify the computation. This way we exchange great convenience in the system's calculation with a small and acceptable error. The sub "c" denotes the critical point, where da/dt reaches its minimum. We assume the value of a'(t) falls into an interval as below at this time, $$0.001 \text{ m/s}^{}3<a'(t)=d(da/dt)/dt<0.1 \text{ m/s}^{}3$$

Note that the ωh in equation (62) is replaced by ωsc, which stands for relative horizontal component of the angular velocity of the scanning laser beam defined in equation (62) and it relates to the longitudinal component and the resultant component ωh by $$\omega bi'=\alpha/Ts-\omega sc$$

This set of five data is associated with one mass point in the body and if all of them meet the above equation set, this mass point will result in a collision, hence, this obstacle body is judged to result in an immediate collision.

F in below stands for the applied force of vehicle braking while Fmax is the available maximum force used for braking, in the unit of "N".

$$F=F\max(1.5/T) \tag{69}$$

Were T is the time pending to collision, in the unit of "s". To cope with a bumpy road $$F=K1^*F\max(h^{**}K2) \tag{70}$$

$$0<h<0.10 \text{ m}$$

$$0.05<K1<5$$

$$0.1<K2<0.5$$

where K1 and K2 are two constants and H is the height of the obstacle detected, in meters.

Rf stands for the distance obtain

It should be understood, of course, that the foregoing relates to preferred embodiments of the invention and that modifications may be made without departing from the spirit and scope of the invention as set forth in the following claims.

I claim:

1. A vehicle collision avoidance system comprising:
    a circumferentially rotating pulsed infrared laser beam scanner apparatus including a laser pulsed emitter and an infrared laser sensor for generating a first signal representative of an obstacle scanned, the laser pulsed emitter rotating circumferentially in a horizontal plane and a vertical plane simultaneously, the infrared laser sensor circumferentially rotating synchronously with the laser pulsed emitter in the horizontal plane and receiving a reflected laser beam signal from the obstacle scanned;

wherein the laser pulsed emitter is emitting a laser beam signal over a 360° field of view and the infrared laser sensor is receiving the reflected laser beam signal over the 360° field of view;

a processing circuit coupled to the circumferentially rotating pulsed infrared laser beam scanner apparatus for processing the first signal and generating a plurality of signals;

a processor coupled to the processing circuit for processing the plurality of signals and generating a braking signal; and a braking apparatus responsive to the braking signal.

2. The vehicle collision avoidance system of claim 1, wherein the circumferentially rotating pulsed infrared laser beam scanner apparatus is operable to scan an object from 1.6 m to 120 m.

3. The vehicle collision avoidance system of claim 1, wherein the circumferentially rotating pulsed infrared laser beam scanner apparatus rotates in the horizontal plane at 48 revolutions per second and with a period of 20.83 ms and in the vertical plane at 8 sectors per second and a period of 20.83 ms.

4. The vehicle collision avoidance system of claim 1, wherein the circumferentially rotating pulsed infrared laser beam scanner apparatus emits a laser beam having 28.45W peak power, an average power of 142 mW, a wavelength between 1 μm and 1.550 μm excluding the region between 1.3 μm and 1.4 μm, and preferably between 1.450 μm and 1.550 μm, a 1.0 ns to 1.25 ns pulse width, a 10 Mhz to 110 Mhz repetition rate, and a 0.002 radian emitting pulsed laser beam divergent angle.

5. A method of avoiding a vehicle collision comprising:
determining features of an obstacle using a circumferentially rotating pulsed infrared laser beam scanner apparatus including a laser pulsed emitter and an infrared laser sensor for generating a first signal representative of the obstacle scanned, the laser pulsed emitter rotating circumferentially in a horizontal plane and a vertical plane simultaneously, the infrared laser sensor circumferentially rotating synchronously with the laser pulsed emitter in the horizontal plane and receiving a reflected laser beam signal from the obstacle scanned;

wherein the laser pulsed emitter is emitting a laser beam signal over a 360° field of view and the infrared laser sensor is receiving the reflected laser beam signal over the 360° field of view;

processing signals representative of the determined features, and braking the vehicle in the event the processed signals indicate an imminent collision.

6. The method of avoiding a vehicle collision of claim 5, wherein the circumferentially rotating pulsed infrared laser beam scanner apparatus emits a laser beam having 28.45W peak power, an average power of 142 mW, a wavelength between 1 μm and 1.550 μm excluding the region between 1.3 μm and 1.4 μm, and preferably between 1.450 μm and 1.550 μm, a 1.0 ns to 1.25 ns pulse width, a 10 Mhz to 110 Mhz repetition rate, and a 0.002 radian emitting pulsed laser beam divergent angle.

7. A method of avoiding a vehicle collision comprising:
circumferentially detecting bodies proximate the vehicle using a circumferentially rotating pulsed infrared laser beam scanner apparatus including a laser pulsed emitter and an infrared laser sensor for generating a first signal representative of a body scanned, the laser pulsed emitter rotating circumferentially in a horizontal plane and a vertical plane simultaneously, the infrared laser sensor circumferentially rotating synchronously with the laser pulsed emitter in the horizontal plane and receiving a reflected laser beam signal from the body scanned;

wherein the laser pulsed emitter is emitting a laser beam signal over a 360° field of view and the infrared laser sensor is receiving the reflected laser beam signal over the 360° field of view;

obtaining data from the circumferentially rotating pulsed infrared laser beam scanner apparatus including a time when the beam reaches a first edge of each body and a time when the beam reaches a second edge of each body;

determining a relative distance from the scanner apparatus to each body;

determining a time to collision with each body; and determining a braking force to avoid a collision with each body.

8. The method of avoiding a vehicle collision of claim 7, further comprising determining a critical point at which an absolute value of the derivative of each bodies acceleration with respect to time approaches zero.

9. The method of avoiding a vehicle collision of claim 8, wherein determining the relative distance and determining the time to collision are initiated at the critical point.

10. The method of avoiding a vehicle collision of claim 7, further comprising determining a relative angular velocity of each body.

11. The method of avoiding a vehicle collision of claim 7, wherein determining the time to collision comprises computing a second order factor.

12. The method of avoiding a vehicle collision of claim 7, further comprising determining the bumpiness of a road surface.

13. The method of avoiding a vehicle collision of claim 12, wherein determining the braking force to avoid a collision with each obstacle comprises determining a first braking force in a case where the time to collision is less than 1.5 seconds and a second braking force in a case where the road is bumpy.

14. The method of avoiding a vehicle collision of claim 7, wherein determining the time to collision further comprises determining vertical and horizontal components of each body.

15. The method of avoiding a vehicle collision of claim 7, further comprising determining a rate of approach of the vehicle and each body.

16. The method of avoiding a vehicle collision of claim 7, wherein the obtaining and determining steps are performed in a point-to-point vector processing manner.

17. The method of avoiding a vehicle collision of claim 7, further comprising using an analog circuit to process the time when the beam reaches the first edge of each body and the time when the beam reaches the second edge of each body, the relative distance from the scanner apparatus to each body, a relative angular velocity of each body, an acceleration of each body, and a derivative of the acceleration.

* * * * *